(12) United States Patent
Lin

(10) Patent No.: US 6,940,524 B2
(45) Date of Patent: Sep. 6, 2005

(54) METHODS FOR ADJUSTING SHARPNESS AND BRIGHTNESS OF DIGITAL IMAGE

(75) Inventor: Wen-Kuo Lin, Taipei (TW)

(73) Assignee: Silicon Integrated Systems Corp., Hsin Chu (TW)

(*) Notice: Subject to any disclaimer, the term of this patent is extended or adjusted under 35 U.S.C. 154(b) by 125 days.

(21) Appl. No.: 10/409,131

(22) Filed: Apr. 9, 2003

(65) Prior Publication Data

US 2004/0201597 A1 Oct. 14, 2004

(51) Int. Cl.$^7$ .................................................. G09G 5/00
(52) U.S. Cl. ....................................................... 345/617
(58) Field of Search ......................................... 345/617

(56) References Cited

PUBLICATIONS

Olympus MIC–D Digital Microscope (Copyright 2002).*

\* cited by examiner

Primary Examiner—Jeffery Brier
Assistant Examiner—Hwa C. Lee
(74) Attorney, Agent, or Firm—Troxell Law Office, PLLC

(57) ABSTRACT

A method for adjusting sharpness and brightness of a digital image. In this method, an image function is first inputted into a processor. The image function comprises a plurality of control parameters. Next, the control parameter values of the control parameters are set, and then each of the pixels is sequentially leaded into the image function according to the control parameter value so as to perform the corresponding operation for adjusting the sharpness and brightness of the image. Finally, the adjusted image is outputted. Therefore, the two processes in the prior art, one for adjusting the brightness, the other for the sharpness, are merged into one process so that the design of the hardware circuit is simplified and the required memory space is reduced.

7 Claims, 2 Drawing Sheets

| brightening | darkening | sharpening | blurring | parameter setting |
|---|---|---|---|---|
| ✓ |   |   |   | $K_1=1, K_2>0, K_3=0$ |
|   | ✓ |   |   | $K_1=1, K_2<0, K_3=0$ |
|   |   | ✓ |   | $K_1>0, K_2=0, K_3=1$ |
|   |   | ✓ |   | $K_1<0, K_2=0, K_3=1$ |
| ✓ |   | ✓ |   | $K_1>0, K_2>0, K_3=1$ |
| ✓ |   |   | ✓ | $K_1>0, K_2<0, K_3=1$ |
|   | ✓ |   | ✓ | $K_1<0, K_2>0, K_3=1$ |
|   | ✓ |   | ✓ | $K_1<0, K_2<0, K_3=1$ |

Fig.2

METHODS FOR ADJUSTING SHARPNESS AND BRIGHTNESS OF DIGITAL IMAGE

BACKGROUND OF THE INVENTION

1. Field of the Invention

The present invention relates to a method for adjusting the sharpness and brightness of a digital image, and particularly to a method for adjusting the sharpness and brightness of a digital image adjustment capable of reducing the memory space.

2. Description of the Prior Art

In order to improve the quality of viewing, it is required to adjust the sharpness and brightness of a digital image. Conventionally, there are two processes for separately adjusting the brightness and the sharpness. In the process of adjusting the sharpness, the following mathematical formula is used.

$$f_s(x,y)=f(x,y)+Af_H(x,y)$$

Where $f_s(x,y)$ is a function for denoting the image after the sharpness adjustment, $f_H(x,y)$ is a function relating to the high frequency components of $f(x,y)$, and A is the sharpness control parameter and is a real number. If the control parameter A is positive, then the outputted $f_s(x,y)$ is the sharpened results. If the control parameter A is negative, then the outputted $f_s(x,y)$ is the blurred result.

Furthermore, in the process of adjusting the brightness, the following mathematical formula is used.

$$f_B(x,y)=f(x,y)(1+B)$$

Where $f_B(x,y)$ is a function for denoting the image after performing the brightness adjustment. B is the brightness control parameter, and is a real number. If the control parameter B is positive, then the outputted $f_s(x,y)$ is the brightened result. Otherwise, if the control parameter B is negative, then the outputted $f_s(x,y)$ is the darkened result.

The prior art method is performed on the digital images by separately implementing the adjustment processes of sharpness and brightness. Therefore, in the design of hardware, it is required to perform one step before the other step is performed so that the complexity of the hardware is increased. In addition, a buffer is needed for temporarily storing the outputted data of the previous step so as to require more memory space.

SUMMARY OF THE INVENTION

In order to resolve the mentioned problems of the prior art method for adjusting the sharpness and the brightness of the digital image, the present invention provides a method for adjusting the sharpness and the brightness of the digital image so as to improve the efficiency and reduced the required memory space.

The present invention relates a method for adjusting the sharpness and brightness of a digital image. In this method, the two processes, separately for adjusting the brightness and the sharpness, are merged into one process so that the design of the hardware circuit is simplified and the required memory space is reduced.

In order to achieve the above objective, the method for adjusting the sharpness and the brightness of the digital image according to the invention is started by inputting an original image data. Next, a plurality of control parameter values are set, and then according the control parameter value, each of the pixels is sequentially led into the original image data so as to perform the corresponding operation for adjusting the sharpness and brightness. Finally, the adjusted image is outputted so as to finish the adjustment of the sharpness and brightness.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings:

FIG. 2 is a function table of the parameters $k_1$, $k_2$ and $k_3$ in the preferred embodiment of the present invention.

DETAILED DESCRIPTION OF THE PREFERRED EMBODIMENT

Figure 1:
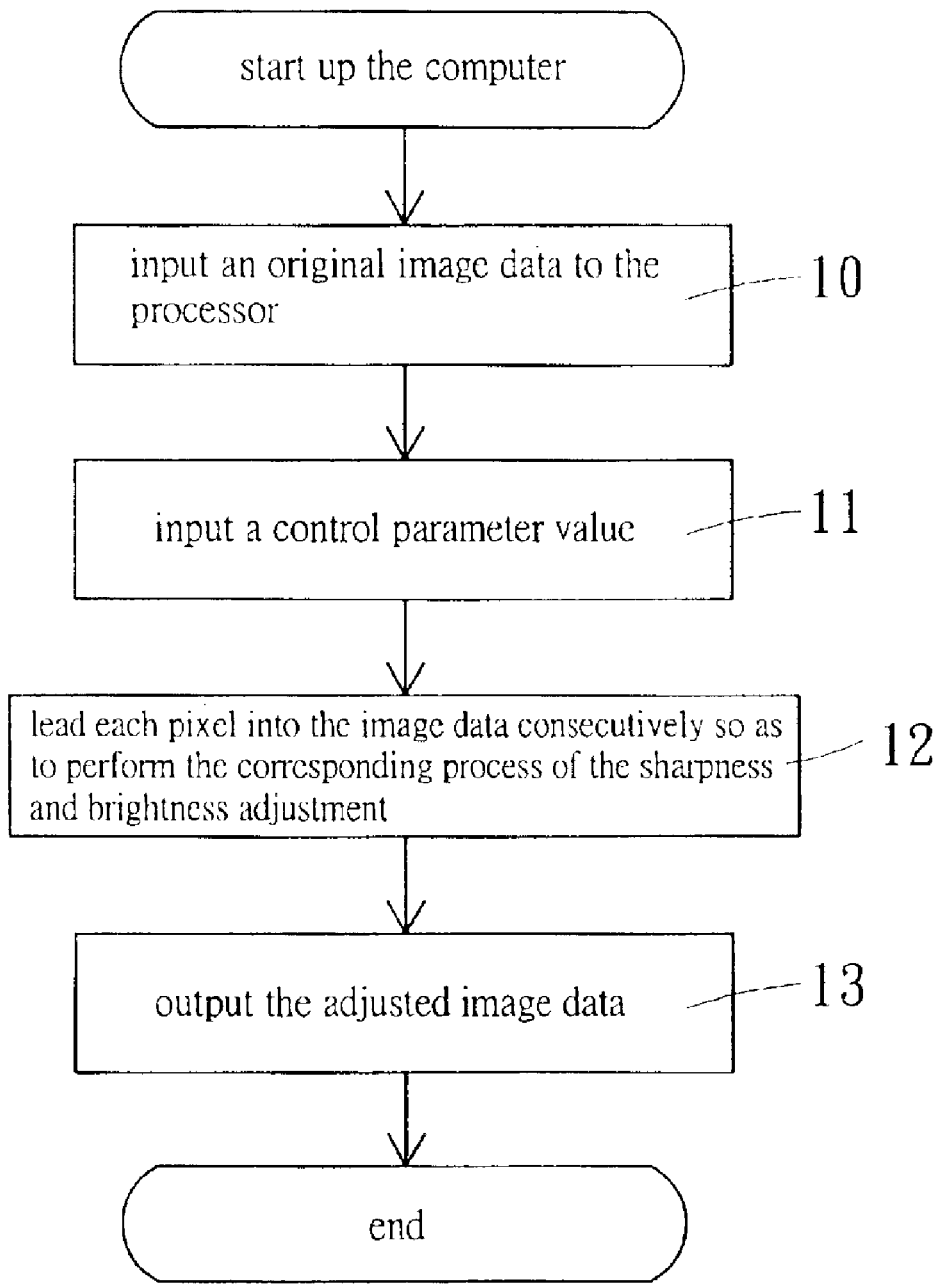
FIG. 1 is a flowchart illustrating a method of adjusting sharpness and brightness of a digital image according to the preferred embodiment of the present invention.

FIG. 1 is a flowchart illustrating a method of adjusting sharpness and brightness of a digital image according to the preferred embodiment of the present invention. A processor is used for implementing this method, and the processor comprises the mathematical formula for adjusting the sharpness and brightness of the digital image. The mathematical formula will be described more detail in the following. The adjustment method comprises the following steps.

First, in the step 10, an image data $f(x,y)$ is inputted into the processor and is led into the mathematical formula. Next, in the step 11, a control parameter value is inputted, and in the step 12, each pixel is sequentially led into the image data $f(x,y)$ so as to perform the corresponding calculation process of the sharpness and brightness adjustment. In the step 13, the adjusted image data is outputted so as to finish the method for adjusting the sharpness and brightness.

The mathematical formula of the sharpness and brightness for the above digital image is expressed as:

$$g(x, y) = f(x, y) + k_1 \sum_{i=-m}^{m} \sum_{j=-n}^{n} w(i, j) \cdot f(x+i, y+j)$$

wherein $g(x,y)$ is the image data after the sharpness and brightness adjustment is performed on the digital image; $f(x,y)$ is the original image data; $k_1$ is the sharpness control parameter; $w(i,j)$ is the spatial high-pass filtering image mask for obtaining the high frequency components of the original image data. In this embodiment, the mask is expressed as:

$$w(i, j) = \frac{1}{W} \begin{bmatrix} \ddots & & \vdots & & \cdot^{\cdot^{\cdot}} \\ & k_3 w_{-1,-1} & k_3 w_{0,-1} & k_3 w_{1,-1} & \\ \cdots & k_3 w_{-1,0} & k_3 w_{0,0}+k_2 & k_3 w_{1,0} & \cdots \\ & k_3 w_{-1,1} & k_3 w_{0,1} & k_3 w_{1,1} & \\ \cdot^{\cdot^{\cdot}} & & \vdots & & \ddots \end{bmatrix}$$

where $k_2$ is the brightness control parameter, $k_3$ is the sharpness adjustment enable parameter, and W is a normalized parameter of the filtering mask.

FIG. 2 shows a function table relating to above parameters, including the sharpness control parameter $k_1$, the brightness control parameter $k_2$ and the sharpness adjustment enable parameter $k_3$. If the sharpness control parameter $k_1>0$, then adjustment is a sharpening process performed on the image. Otherwise, if the sharpness control parameter $k_1<0$, then the adjustment is a blurring process performed on the image. If the brightness control parameter $k_2>0$, then the adjustment is a brightening process performed on the image. Otherwise, if the brightness control parameter $k_2<0$, then the adjustment is a darkening process performed on the image. If the sharpness adjustment enable parameter $k_3=0$, then sharpness adjustment is disabled. Otherwise, if the sharpness adjustment enable parameter $k_3=1$, then the sharpness adjustment is enabled.

It should be noticed that in the above mathematical formula, if n=0, then the image adjustment is only proceed in the horizontal orientation, and if m=0, then the image adjustment is only proceed in the vertical orientation.

Furthermore, the above sharpness and brightness adjustment is only applied to grayscale components. If the image is in a RGB system, then the adjustment for brightness and sharpness can be applied to each of the three color components. If the image is in YUV system, then the adjustment for brightness and sharpness only can both be applied to Y, but only the adjustment for sharpness can be applied to U and V. That is, the brightness of U and V cannot be adjusted.

The following is another preferred embodiment of the mathematical formula for adjusting the sharpness and brightness of the digital image. In this embodiment, the two well-known Laplacian high-pass filters are used for extracting the high frequency components of the image, and the sampling data of the two filters presented in one dimension are:

$$F_1=[-1,2,-1] \text{ and}$$

$$F_2=[-1,0,2,0,-1]$$

Where $F_1$ is one half cycle of the sampling frequency data, and $F_2$ is a quarter cycle of the sampling frequency data. Therefore, by using the high frequency components in these two frequency ranges, the sharpness adjustment of the image is performed. It should be noticed that the brightness adjustment is irrelevant to the frequency components.

The spatial filtering mask corresponding to the above sampling frequency $F_1$ is:

$$W_1 = \frac{1}{W}\begin{bmatrix} -1 & -1 & -1 \\ -1 & 8 & -1 \\ -1 & -1 & -1 \end{bmatrix}$$

And the spatial filtering mask corresponding to the above sampling frequency $F_2$ is:

$$W_2 = \frac{1}{W}\begin{bmatrix} -1 & 0 & -1 & 0 & -1 \\ 0 & 0 & 0 & 0 & 0 \\ -1 & 0 & 8 & 0 & -1 \\ 0 & 0 & 0 & 0 & 0 \\ -1 & 0 & -1 & 0 & -1 \end{bmatrix}$$

Where W is the normalized parameter of the two spatial filtering masks. It is preferred that the range of W is from 7 to 11.

After applying the above masks $W_1$ and $W_2$ to the present invention, by using the high-pass filtering mask formula described in the previous preferred embodiment, the masks $W_1$ and $W_2$ are respectively converted to the followings:

$$W_1(i,j) = \frac{1}{W}\begin{bmatrix} -k_3 & -k_3 & -k_3 \\ -k_3 & -k_3 8+k_2 & -k_3 \\ -k_3 & -k_3 & -k_3 \end{bmatrix} \text{ and}$$

$$W_2(i,j) = \frac{1}{W}\begin{bmatrix} -k_3 & 0 & -k_3 & 0 & -k_3 \\ 0 & 0 & 0 & 0 & 0 \\ -k_3 & 0 & -k_3 8+k_2 & 0 & -k_3 \\ 0 & 0 & 0 & 0 & 0 \\ -k_3 & 0 & -k_3 & 0 & -k_3 \end{bmatrix}$$

Then the present invention can be expressed by the following mathematical formula:

$$g(x,y) = f(x,y) + a \cdot k_1 \sum_{i=-1}^{1}\sum_{j=-1}^{1} w_1(i,j) \cdot f(x+i, y+j) + (1-a) \cdot k_1 \sum_{i=-2}^{2}\sum_{j=-2}^{2} w_2(i,j) \cdot f(x+i, y+j)$$

where g(x,y) is the adjusted image data, f(x,y) is the original image data, $a \cdot k_1$ is the frequency data of one half sampling frequency; $(1-a) \cdot k_1$ is the frequency data of a quarter sampling frequency. The value of a is $0 \leq a \leq 1$.

The above is the detailed description of the method for adjusting the sharpness and brightness of the digital image according to the present invention. In this method, the two processes, separately for adjusting the sharpness and brightness, are merged into one process so that the circuit design is simplified and the required memory space is reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for adjusting sharpness and brightness of an digital image being implemented by a processor, the method comprising the steps of:

selecting a mathematical formula for adjusting the sharpness and brightness of the digital image being stored in the processor from a group of mathematical formula consisting of:

a) $g(x,y) = f(x,y) + k_1 \sum_{i=-m}^{m}\sum_{j=-n}^{n} w(i,j) \cdot f(x+i, y+j);$ b) $g(x,y) = f(x,y) + a \cdot k_1 \sum_{i=-1}^{1}\sum_{j=-1}^{1} w_1(i,j) \cdot f(x+i, y+j) + (1-a) \cdot k_1 \sum_{i=-2}^{2}\sum_{j=-2}^{2} w_2(i,j) \cdot f(x+i, y+j);$ inputting original image data into the processor and leading the original image data into the selected mathematical formula;

inputting a plurality of control parameter values into the selected mathematical formula;

leading each pixel into the image data sequentially so as to perform a corresponding calculation process of adjusting the sharpness and brightness; and outputting an adjusted image data.

2. The method of claim 1, wherein in the step of inputting a plurality of control parameter values, the inputted parameters include a sharpness control parameter, a brightness control parameter and a sharpness adjustment enable parameter.

3. The method of claim 2, wherein if the sharpness control parameter $k_1>0$, then adjustment is a sharpening process performed on the image; otherwise, if the sharpness control parameter $k_1<0$, then the adjustment is a blurring process performed on the image.

4. The method of claim 2, wherein if the brightness control parameter $k_2>0$, then the adjustment is a brightening process performed on the image; otherwise, if the brightness control parameter $k_2<0$, then the adjustment is a darkening process performed on the image.

5. The method of claim 2, wherein if the sharpness adjustment enable parameter $k_3>0$, then sharpness adjustment is disabled; otherwise, if the sharpness adjustment enable parameter $k_3<1$, then the sharpness adjustment is enabled.

6. The method of claim 1, wherein in the inputting step the mathematical formula is:

$$g(x, y) = f(x, y) + k_1 \sum_{i=-m}^{m} \sum_{j=-n}^{n} w(i, j) \cdot f(x+i, y+j).$$

7. The method of claim 1, wherein in the inputting step the mathematical formula is:

$$g(x, y) = f(x, y) + a \cdot k_1 \sum_{i=-1}^{1} \sum_{j=-1}^{1} w_1(i, j) \cdot f(x+i, y+j) + (1-a) \cdot k_1 \sum_{i=-2}^{2} \sum_{j=-2}^{2} w_2(i, j) \cdot f(x+i, y+j).$$

* * * * *